March 21, 1950     R. M. WALKER     2,501,110
INDICATING CIRCUIT
Filed Jan. 24, 1945

TIME

INVENTOR.
ROBERT M. WALKER
BY William D. Hall
Attorney.

Patented Mar. 21, 1950

2,501,110

UNITED STATES PATENT OFFICE 2,501,110

INDICATING CIRCUIT

Robert M. Walker, Belmont, Mass., assignor, by mesne assignments, to the United States of America as represented by the Secretary of War Application January 24, 1945, Serial No. 574,370

8 Claims. (Cl. 315—22)

This invention relates to scanning and modulating circuits for cathode ray tubes and more particularly to those applications of cathode ray tubes wherein it is desirable that the modulation of the electron beam bear some relationship to the scanning cycle of the beam.

Accordingly, it is one object of my invention to provide means for regulating the modulation intensity of the electron beam in a cathode ray tube in a predetermined relation to a sweep cycle of the beam.

In certain applications of cathode ray tubes in which a visible trace is produced on a screen by a moving electron beam, it is desirable to use a type of scan known in the art as P. P. I. or plan position indication. In the so-called P. P. I. type of presentation the electron beam is moved radially outward from a given point, usually the center of the screen, and simultaneously is effectively rotated in a circular path about the given point as a center.

A full radial sweep cycle moves the beam from its origin or starting point, which as stated is customarily the center of the cathode ray tube screen, toward the periphery of the screen and back to the starting point while a full angular scanning cycle generally comprises a 360 degree rotation of the radial scanning trace about its origin. The period of a radial sweep cycle is usually much shorter than the period of an angular scanning cycle, and hence between successive radial sweeps the beam is displaced only slightly in angular position, the composite effect being that of a spoke of a wheel rotating about its hub.

When such a scan is intensity modulated, upon receipt of a signal, an indication of the signal appears on the screen in the form of a visible spot produced by the change in excitation of the material of which the screen is composed. In certain types of cathode ray tubes, known as dark trace tubes, such excitation causes a darkening of the screen material in contrast to its natural color.

Normally the signal indication will disappear in a short period of time which is generally of the order of a few seconds. Too frequent or excessively intense bombardment of a particular portion of a screen of the dark trace type, however, will darken the screen to the point where the signal indication does not fade in a reasonable length of time and becomes almost indelible.

In a P. P. I. type of presentation this undesirable effect may arise from the fact that the angular displacement between successive radial sweeps is often so slight that a signal indication produced near the center of the screen by intensity modulation of a portion of one radial sweep may overlap a signal indication produced by a corresponding portion of the preceding radial sweep, or successive radial sweep traces may overlap even in the absence of modulation.

Accordingly, another of the objects of my invention is to minimize the likelihood of overexcitation caused by the condition described above, preferably by affecting the degree of modulation of the cathode ray beam in a manner which bears some degree of proportionality to the amount of deflection of the beam from its origin or starting point.

Other objects will be apparent to those skilled in the art after a study of the following specification and claims, and the accompanying drawing, in which:

Briefly, the operation of the apparatus is as follows: Video signals are applied to one grid of a multielectrode electron tube, on another grid of which is simultaneously impressed a sawtooth voltage wave. The combined effect of the two voltages is to produce in the output circuit of the tube video pulses, the amplitude of which varies with the amplitude of the applied sawtooth wave. The latter is so generated with respect to a sweep voltage wave supplied to an associated cathode ray tube that the video pulses of lesser amplitude intensity modulate the initial portion of the cathode ray tube sweep.

Figure 1:
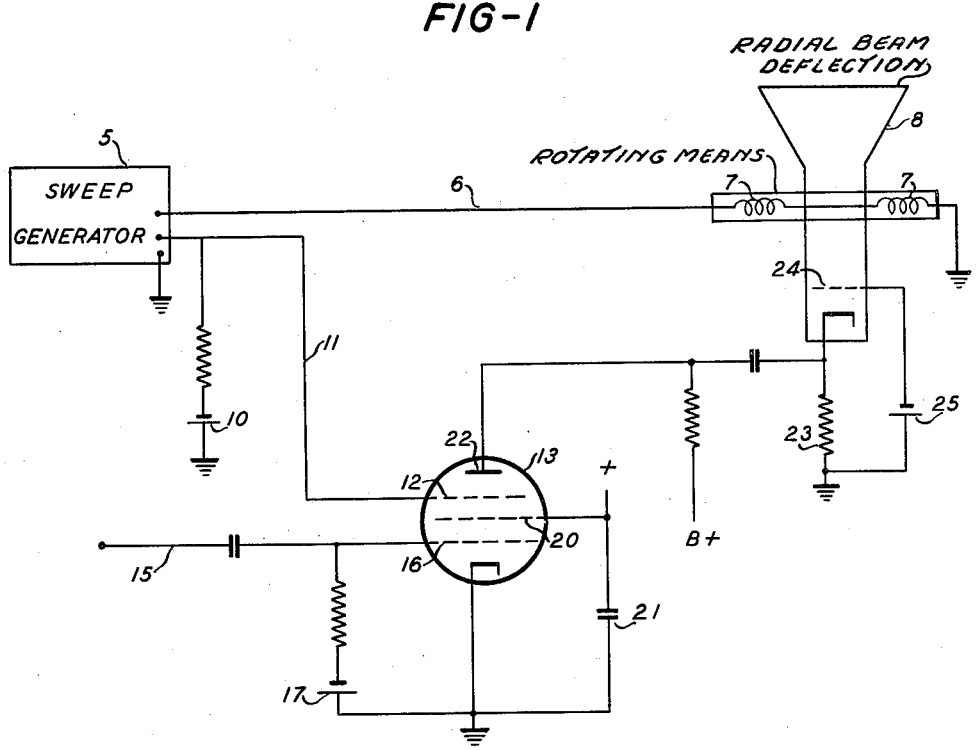
Fig. 1 is a circuit diagram showing one embodiment of the invention.

Referring now to Fig. 1, a sweep generator 5 generates a suitable deflection pulse for producing radial motion of the electron beam. This pulse is applied through lead 6 to the deflecting means 7, which is indicated as suitable magnetic coils, of the cathode ray tube 8. The radial sweep is angularly rotated about the center by means 9 but may be any suitable means. Simultaneously with the generation of this deflection pulse the sweep generator produces a sawtooth voltage wave, a portion of which is applied to a grid 12 of a control tube 13 through a lead 11. In the present embodiment the potential of grid 12 is made sufficiently negative by means of a suitable biasing arrangement 10, that it does not approach ground potential until the peak of the applied sawtooth wave.

The output of a radio receiver, in the form of video pulses of positive polarity, is applied through a lead 15 and a suitable coupling circuit to a grid 16 of the control tube 13. Grid 16 normally is biased in the vicinity of cut-off potential by a source of negative voltage 17. Grid 20 of tube 13 is biased positively and a by-pass capacitor 21 is provided to remove any alternating components in the current which it carries.

The output of tube 13 is controlled in part by the potential appearing on grid 12, and as this potential varies substantially linearly over the period of application of the sawtooth voltage wave, the output of the stage also varies linearly. Therefore, as a result of applying the video pulses there will appear at plate 22 pulses of opposite polarity and varying amplitude, the amplitude of each being related to the amplitude of the corresponding portion of the sawtooth wave.

In practice, a ratio of approximately 2:1 between the amplitude of the pulses developed toward the final portion of the sweep and those developed near the initial portion has been used.

The bias due to voltage source 10 existing on grid 12 of vacuum tube 13 prior to the application of a sawtooth wave, while variable within limits without seriously affecting the operation of the circuit, is as a rule not sufficient to stop the flow of plate current in the tube, and at times is appreciably above the cut-off point.

The output pulses are applied to the cathode ray tube 8, by a suitable coupling circuit in such a manner as to produce intensity modulation of the electron beam. In the present embodiment of the invention, this is done by developing a voltage proportional to the amplitude of the pulses across cathode resistor 23 of the tube 8, grid 24 of this tube being held at a fixed potential by a voltage source 25. Since the amplitude of the output pulses varies in a linear fashion, the voltage pulses across resistor 23 will vary in a like manner, with the smaller-amplitude signals appearing on the cathode ray tube screen at the beginning of each radial sweep excursion, the signal amplitude increasing with increasing deflection of the electron beam.

Figure 2:
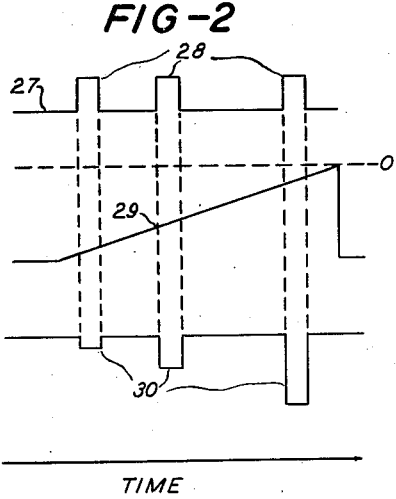
Fig. 2 is a timing diagram showing the waveforms of special importance in the system and their proper time relationship.

Fig. 2 sets forth a showing of the voltage waveforms mentioned hereinabove, these waveforms being shown on a common time scale but having different voltage scales. Video pulses 28 represent the output of a radio receiver biased so that the base line 27 is in the neighborhood of cut-off potential of the tube 13. Waveform 29 represents the sawtooth voltage output of sweep generator 5 as it appears on grid 12. A reference line representing zero voltage is included to show the effect of the biasing source 10. Video pulses 30, each of which corresponds to one of the pulses 28, appear at the plate electrode 22 and also across the cathode resistor 23.

It will be apparent to those skilled in the art that further stages of amplification may be inserted between the output of vacuum tube 13 and cathode ray tube 8 and the amplified modulating pulses may then be supplied to grid 24 of cathode ray tube 8.

In addition it will be noted that although the voltage waveform applied to grid 12 of vacuum tube 13 has hereinbefore in this application been stated or assumed to be serrated, waveforms of other shapes may be used as the exigencies of particular applications of my invention may require. The controlling factor of course will be the type of scanning contemplated.

There are, furthermore, other modifications and adaptations of the circuit which fall fairly within the purview of my invention as defined in the hereinafter appended claims and therefore I claim all such modifications as may fall fairly within their spirit and scope.

What I claim is:

1. A cathode ray tube apparatus including means for developing, means for modulating and means for deflecting an electron beam in a radial direction toward the periphery of the tube and for electrically displacing successive sweeps about the center, means for developing a series of electrical pulses having a waveform which is substantially serrated, a multi-grid vacuum tube having at least one output electrode, means for impressing at least a portion of said series of pulses having the serrated waveform on at least one of the grid electrodes of said multi-grid vacuum tube, means for providing signal pulses from an external source, means for impressing said signal pulses on a control grid of said multi-grid vacuum tube, means for impressing at least a portion of said serrated waveform pulses onto said electron beam-deflecting means, and means coupling the output of said multi-grid vacuum tube to said electron beam-modulating means.

2. In an electronic indicator including means for developing a cathode ray beam and directing said beam onto a circular interpreting element, and wherein means are provided for modulating and deflecting said beam in a radial direction toward the periphery of the interpreting element and for electrically displacing successive sweeps about the center, said indicator being adapted for use in conjunction with means for providing a set of electrical pulses, the method of controlling the cathode ray beam which includes the steps of developing electrical energy of a predetermined wave shape to deflect the cathode ray beam during its radial travel, mixing a portion of the developed energy wave with the set of provided pulses, and controlling the modulation of the beam in accordance with electrical energy developed by mixing said wave of electrical energy and said set of pulses.

3. In a cathode ray tube apparatus means for generating, modulating and deflecting an electron beam, means for developing electrical energy of a predeterminable waveform to deflect said developed electron beam radially from the center to the periphery of the tube, a thermionic tube having an anode, a cathode and at least one control electrode, means for impressing at least a portion of the electrical energy of said predeterminable waveform upon said control electrode of said thermionic tube, and means coupling the output of said tube to said electron beam-modulating means whereby the modulation of said beam is affected by the output of said thermionic tube.

4. Apparatus in accordance with claim 3, in which said thermionic tube includes a second control electrode and wherein there is provided means for impressing upon said second control electrode electrical pulses supplied by a source external to said tube.

5. An electronic indicator wherein there is provided means for generating, modulating and deflecting a cathode ray beam, a circular interpreting element receiving said beam, means for generating energy of a predeterminable waveform to deflect said beam from the center to the periphery of said element, means for impressing at least a portion of said generated energy of said predeterminable waveform onto the means for deflecting said beam, and means for affecting the modulation of said beam under the control of at least a portion of the energy generated for deflecting said beam.

6. In an electronic indicator, a cathode ray tube having an interpreting element, means for deflecting an electron beam to generate a sweep from the center to the periphery of the interpreting element and for angularly displacing successive sweeps about the center of the interpreting element, means for generating a series of electrical pulses whose waveform is substantially serrated, a multigrid vacuum tube having at least one output electrode, means for impressing a portion of said series of pulses on a grid electrode of said vacuum tube, means for providing signal pulses from an external source, means for impressing said signal pulses on a control grid of said tube, means for impressing a portion of said serrated waveform pulses onto said electron beam deflecting means and means coupling the output of said multigrid tube to said electron beam modulating means to increase the intensity of the electron beam substantially in proportion to its displacement from the center.

7. A method for controlling the excitation of the screen of a cathode ray tube having a radial sweep and rotary scan comprising supplying the tube with pulse signals, deflecting the cathode ray beam radially and modulating the intensity of the beam to increase its intensity in proportion to its displacement from the center.

8. In combination, a cathode ray tube comprising a luminous screen, an electron-gun adapted to project an electron stream on a concentrated spot on said screen, a deflector for said electron stream adapted to deflect it along a radius of said screen, means for angularly rotating the direction of said radius about a central point of said screen to trace overlapping paths thereon, and means for varying the intensity of said electron stream proportionally with its radial deflection from the center of said screen.

ROBERT M. WALKER.

REFERENCES CITED

The following references are of record in the file of this patent:

UNITED STATES PATENTS

| Number | Name | Date |
|---|---|---|
| 2,137,262 | Bowman-Manifold | Nov. 22, 1938 |
| 2,182,326 | Urtel | Dec. 5, 1939 |
| 2,222,943 | George | Nov. 26, 1940 |
| 2,283,951 | Ripley | May 26, 1942 |
| 2,343,988 | Mohoney, Jr. | Mar. 14, 1944 |
| 2,406,858 | Shepherd et al. | Sept. 3, 1946 |
| 2,416,199 | Nagel | Feb. 18, 1947 |
| 2,419,118 | Christaldi et al. | Apr. 15, 1947 |